United States Patent [19]

Tessier

[11] Patent Number: 5,414,961
[45] Date of Patent: May 16, 1995

[54] SEALING STRIP, INTENDED IN PARTICULAR FOR FORMING A SLIDEWAY FOR A MOVING GLASS IN A MOTOR VEHICLE

[75] Inventor: Bernard Tessier, Chalette sur Loing, France

[73] Assignee: Hutchinson, Paris, France

[21] Appl. No.: 53,169

[22] Filed: Apr. 26, 1993

[30] Foreign Application Priority Data

Apr. 27, 1992 [FR] France ................................ 92 05157

[51] Int. Cl.⁶ ............................................ E05D 15/16
[52] U.S. Cl. ...................................... 49/441; 49/489.1
[58] Field of Search ...................... 49/440, 441, 475.1, 49/489.1, 493.1, 495.1, 498.1

[56] References Cited

U.S. PATENT DOCUMENTS 4,409,756 10/1983 Audenino et al. ..................... 49/440
5,013,379 5/1991 Brooks et al. ....................... 49/475.1

FOREIGN PATENT DOCUMENTS

| 175386 | 3/1986 | European Pat. Off. . | |
|---|---|---|---|
| 194236 | 9/1986 | European Pat. Off. | 49/440 |
| 403854 | 12/1990 | European Pat. Off. . | |
| 412782 | 2/1991 | European Pat. Off. . | |
| 1268573 | 6/1961 | France | 49/440 |
| 1683732 | 3/1966 | Germany | 49/440 |

*Primary Examiner*—Michael J. Milano
*Attorney, Agent, or Firm*—Bell, Seltzer, Park & Gibson

[57] ABSTRACT

The invention relates to a sealing strip for forming a slideway for a moving glass in a motor vehicle, the strip comprising a bottom and two lateral flanges constituting an internal leg and an external leg each connected to the bottom via a respective connection zone forming a hinge. The strip is received in a rabbet in the window frame of the door and whose right cross-section is generally channel-shaped. The strip also includes an-internal reinforcing tongue whose base is scoured to the internal leg and whose free end comes substantially into contact with the bottom to block the hinge situated between the bottom and the internal leg of the strip.

4 Claims, 1 Drawing Sheet

SEALING STRIP, INTENDED IN PARTICULAR FOR FORMING A SLIDEWAY FOR A MOVING GLASS IN A MOTOR VEHICLE

FIELD OF THE INVENTION

The invention relates to a sealing strip intended, in particular, for forming a slideway for a moving glass in a motor vehicle, the strip comprising a bottom having two lateral flanges or "legs" respectively connected to the bottom via two connection zones, each of which forms a hinge, and at least one lip for coming into contact with the moving glass, said strip, once received in a rabbet in the frame of a window bay in a motor vehicle door having a right cross-section that is generally channel-shaped, with its two legs disposed facing each other and substantially parallel.

BACKGROUND OF THE INVENTION

Numerous embodiments are already known of sealing strips that are mounted in stationary manner on the frame around a window bay in a door of a vehicle to which they are fitted, said strips being intended to provide the required sealing against water and also to contribute to providing sound insulation.

Such strips are referred to as "slideways" when they are disposed around the top and the sides of the window bay that is suitable for being opened or closed by the glass, whereas they are referred to as "wipe seals" when they are provided along the bottom edge of the window bay.

Slideways and wipe seals are fitted with at least one sealing lip of natural or synthetic rubber, which lip, on being deformed, presses against the moving glass with which it is suitable for co-operating. Given that pressing such a lip against the glass tends to brake the sliding thereof, the surface of the lip that is in contact with the glass is advantageously covered in a material that has good sliding properties.

In general, due to conditions that are unfavorable to glass sliding and that can give rise to considerable friction resistance, the sliding motion of the glass away from its closed position can give rise to traction forces that tend to extract the strip from its housing.

To avoid or limit unwanted extraction of the strip from its housing, a slideway is generally fitted with locking means such as projections, for example, which are positioned in housings formed by folds in the rabbet in order to lock the strip in place. However, in some cases, because of the way the vehicle is designed, the rabbet does not have such folds suitable for securing the strip.

OBJECTS AND SUMMARY OF THE INVENTION

An object of the invention is to mitigate this drawback, and to this end the invention provides a sealing strip of the above-specified type wherein the strip also includes at least one internal reinforcing tongue whose base is secured to one of the legs and whose free end comes into the immediate vicinity of the bottom so as to lock the hinge situated between the bottom and said leg once the strip has been installed in the window frame of the door.

In a preferred embodiment of the invention, the free end of the reinforcing tongue comes into contact with the bottom of the strip.

Taking the two legs of the strip to be respectively an internal leg and an external leg (relative to the cabin of the vehicle), the base of the reinforcing tongue is secured, for example, to the internal leg of the strip when the external leg cannot be locked in position by the rabbet in which the strip is received.

According to an important advantage of the invention, the zone where the external leg of the strip is flush with the outside window frame of the door does not suffer degradation, thereby maintaining the appearance of the vehicle door.

According to another advantage of the invention, the zone where the strip is flush with the outside window frame of the door is supported in a way that does not facilitate intrusion of a tool handled by a person attempting to gain access to the door-looking system from the outside.

BRIEF DESCRIPTION OF THE DRAWING

Other advantages, characteristics, and details of the invention appear from the following explanatory description made with reference to the accompanying drawing, given purely by way of example, and in which.

MORE DETAILED DESCRIPTION

Figure 1:
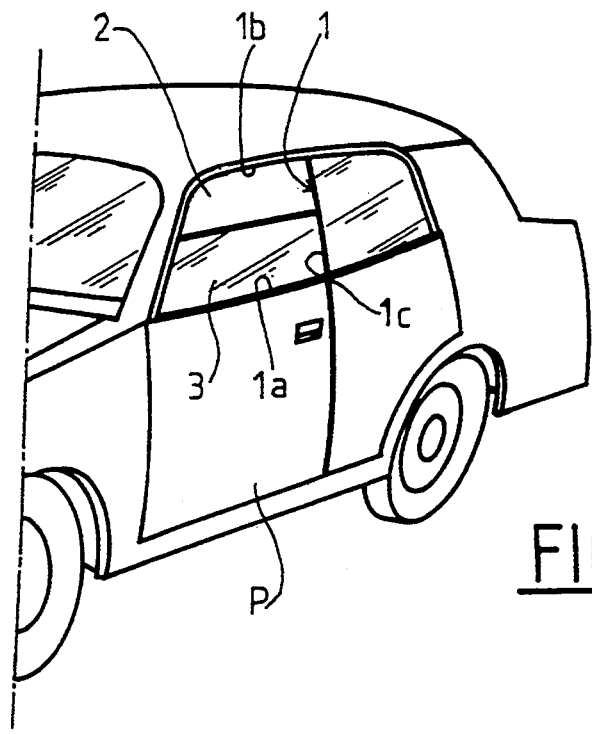
FIG. 1 is a fragmentary perspective view of a portion of car bodywork for the purpose of situating the invention in the window bay of a door.

A sealing strip given overall reference 1 is provided on the window frame of the window bay 2 in the door P of a self-propelled vehicle. The window bay 2 is suitable for being opened or closed by a sliding window glass 3, as shown diagrammatically in FIG. 1. Such a strip 1 generally comprises a wiper seal 1a which is fixed to the bottom part of the frame around the window bay 2, and by slideways 1b and 1c which are fixed respectively to the top part and to the side parts of the frame of the window bay 2.

Figure 2:
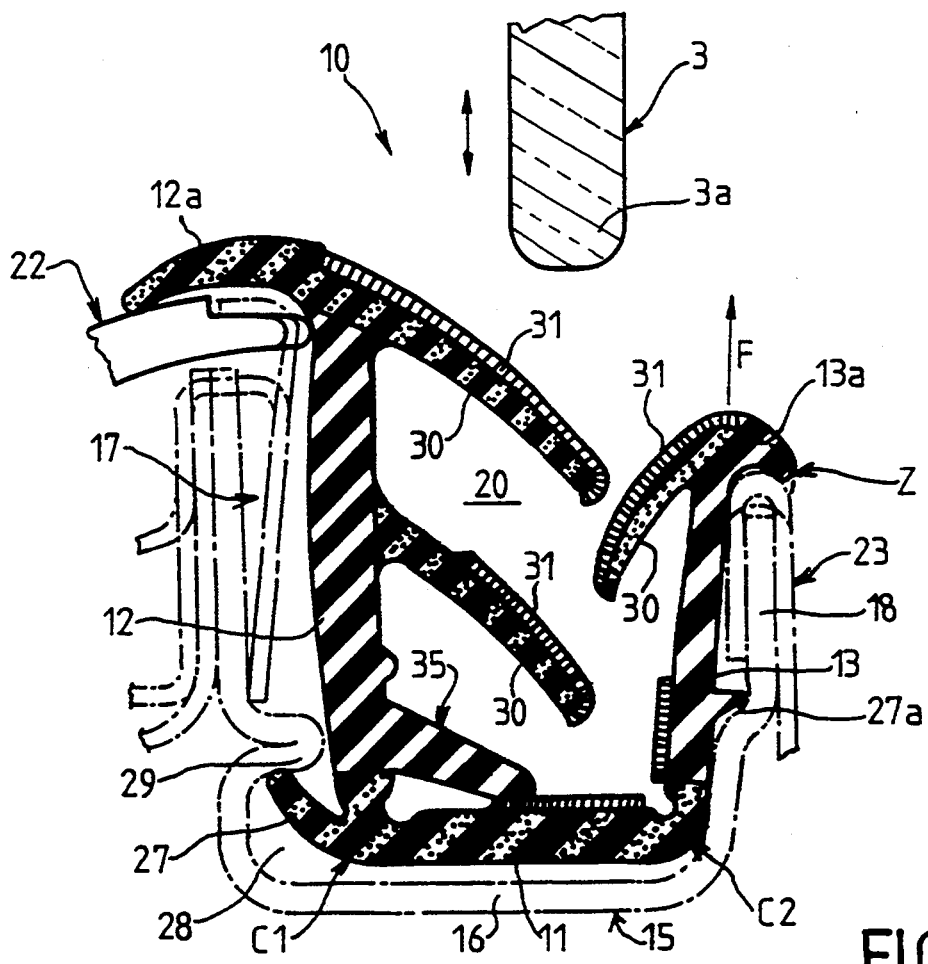
FIG. 2 is a cross-section view through one embodiment of a sealing strip of the invention.

The sealing strip 10 of the invention and as shown more particularly in FIG. 2, is particularly intended to form the slideway 1b and/or 1c of the strip shown in FIG. 1.

The strip 10 comprises a bottom 11 and two lateral flanges or "legs" 12 and 13 connected to the bottom 11 via two connection zones C1 and C2, each of which forms a hinge, thereby enabling the strip 10 to deform while being installed in the frame associated with the vehicle door P.

In the example considered herein, the frame is constituted by a rabbet 15 having a generally channel-shaped cross-section, with a web 16 and two facing flanges 17 and 18 that are parallel. When the strip 10 is engaged in the rabbet 15:

its bottom 11 presses generally against the web 16 of the rabbet 15; and its two legs 12 and 13, after pivoting about their connection zones C1 and C2, generally press against respective flanges 17 and 18 of the rabbet 15.

Thus, the two legs 12 and 13 generally end up parallel and facing each other, delimiting between them a groove 20 in which the associated end portion 3a of the window glass 3 is designed to be engaged.

In the following description, the legs of the strip 10 are respectively referred to as the internal leg 12 and as the external leg 13, and the two flanges of the rabbet 15 are respectively referred to as the internal flange 17 and the external flange 18, with "internal" and "external" being relative to the vehicle cabin.

The internal leg 12 of the strip 10 has an external rim 12a towards its end opposite from the bottom 11, which rim bears against a portion 22 of the inside window frame in the vehicle door. The end of the leg 13 opposite from the bottom 11 includes an internal rim 13a which bears against a portion 23a of the outside window frame of the vehicle door, co-operating therewith to delimit a rectilinear flush zone Z therewith, To secure the strip 10 to the inside of the rabbet 15, locking means are provided that are a function of the internal profile of the rabbet 15.

In the example described, said means comprise a side projection 27 situated at the base of the internal leg 12 and designed to engage in a housing 28 delimited between the web 16 and a fold 29 in the internal flange 17 of the rabbet 15. In contrast, for the external leg 13 of the strip 10, there is room only for a small rib or a small external lateral projection 27a from the external leg 13, since the substantially rectilinear profile of the external flange 18 of the rabbet 15 does not leave room for any kind of housing to be defined that is suitable for receiving a locking element.

In conventional manner, the strip 10 also includes a plurality of lips 30 for coming into contact with the glass 3. Advantageously, the surfaces of the laps 30 that make contact with the glass 3 are covered in a material 31 that exhibits good sliding qualities.

Under such conditions, if traction force is exerted in the direction of arrow F on the external leg 13, the strip 10 may pivot about the hinge-forming connection zone C1 between the bottom 11 and the internal leg 12 of the strip 10.

Such a traction force may be the result, for example, of abnormally high sliding resistance of the glass 3 starting from its closed position, and it may cause the strip 10 to be partially extracted from the rabbet 15. The zone Z where the strip 10 comes into contact with the external window frame of the vehicle door is then no longer flush. The appearance of the door is thus degraded, and proper sealing also suffers.

Thus, according to the invention, an internal reinforcing tongue 35 is provided to prevent the strip pivoting about the hinge C1.

In the example described herein, this reinforcing tongue 35 has its base secured to the internal leg 12 of the strip 10 and has its free end coming into the immediate vicinity of and advantageously into contact with the bottom 11 of the strip 10.

The legs 12 and 13 of the strip 10 and the reinforcing tongue 35 are advantageously extruded out of an elastomer material that is harder than the elastomer material which is co-extruded therewith to form the bottom 11 of the strip 10.

In general, sufficient distance exists between the end of the reinforcing tongue 35 and the connection zone C2 between the external leg 13 of the strip 10 to enable the window 3 to come into contact with or into the vicinity of the bottom 11.

Naturally, the invention is not limited in any way to the embodiment described above. In particular, it is possible to provide a reinforcing tongue at each of the connection zones for the legs of the strip 10, should that be necessary.

I claim:

1. A sealing strip for forming a slide way for a moving glass in a motor vehicle, the strip comprising a bottom having two lateral flanges which, relative to the vehicle cabin, define an internal leg and an external leg respectively connected to the bottom via two connection zones, each of which forms a hinge, and at least one lip for coming into contact with the moving glass, said strip, once received in a rabbet in the frame of a window bay in a motor vehicle door having a right cross-section that is generally channel shaped, with its two legs disposed facing each other and substantially parallel, the strip also including at least one internal reinforcing tongue whose base is secured to the internal leg and whose free end comes into contact with the bottom so as to lock the hinge situated between the bottom and said leg and to lock said strip in place where a traction force is exerted on the external leg of the strip.

2. A sealing strip according to claim 1, wherein the free end of the reinforcing tongue comes into contact with the bottom of the strip.

3. A sealing strip according to claim 1, wherein the legs and the reinforcing tongue are extruded out of an elastomer material that is harder than the elastomer material co-extruded therewith to form the bottom of the strip.

4. A sealing strip for forming a slide way for a moving glass in a motor vehicle, the strip comprising a bottom having two lateral flanges which, relative to the vehicle cabin, define an internal leg and an external leg respectively connected to the bottom via two connection zones, each of which forms a hinge, and at least one lip secured to said internal leg and extending therefrom toward said external leg for coming into contact with the moving glass, said strip, once received in a rabbet in the frame of a window bay in a motor vehicle door having a right cross-section that is generally channel shaped, with its two legs disposed facing each other and substantially parallel, the strip also including at least one internal reinforcing tongue whose base is secured to the internal leg and whose free end comes into contact with the bottom so as to lock the hinge situated between the bottom and said leg and to lock said strip in place where a traction force is exerted on the external leg of the strip.

* * * * *